(12) United States Patent
Suyama et al.

(10) Patent No.: US 8,394,543 B2
(45) Date of Patent: Mar. 12, 2013

(54) ELECTRICAL POWER STORAGE SYSTEM USING HYDROGEN AND METHOD FOR STORING ELECTRICAL POWER USING HYDROGEN

(75) Inventors: Shoko Suyama, Kawasaki (JP); Yoshiyasu Ito, Yokohama (JP); Shigeo Kasai, Kamakura (JP); Yasuo Takagi, Chigasaki (JP); Tsuneji Kameda, Tokyo (JP); Kentaro Matsunaga, Tokyo (JP); Masato Yoshino, Yokohama (JP); Daisuke Horikawa, Yokohama (JP); Kazuya Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/208,031

(22) Filed: Aug. 11, 2011

(65) Prior Publication Data
US 2012/0208100 A1 Aug. 16, 2012

Related U.S. Application Data

(63) Continuation of application No. PCT/JP2010/000905, filed on Feb. 15, 2010.

(30) Foreign Application Priority Data

Feb. 16, 2009 (JP) ............... P2009-032494
Mar. 5, 2009 (JP) ............... P2009-051558
Feb. 9, 2010 (JP) ............... P2010-026457

(51) Int. Cl.
*H01M 8/06* (2006.01)
*H01M 8/10* (2006.01)
*H01M 8/22* (2006.01)
*C25B 1/04* (2006.01)
*C25B 9/04* (2006.01)

(52) U.S. Cl. ........ 429/422; 429/418; 429/479; 429/505; 204/194; 204/272; 205/637

(58) Field of Classification Search ............. 429/1, 418, 429/422, 440, 479, 505; 428/414, 448; 264/29.7; 501/88; 204/274, 272, 194; 165/110, 104.11; 205/637
See application file for complete search history.

(56) References Cited

U.S. PATENT DOCUMENTS 3,253,985 A 5/1966 Seymour et al.
4,809,771 A * 3/1989 Kennel et al. ............ 165/10
(Continued)

FOREIGN PATENT DOCUMENTS

EP 1 873 397 A2 1/2008
JP 02-149476 A 6/1990
(Continued)

OTHER PUBLICATIONS

Machine Translation of: JP 2007/051328, Kato et al., Mar. 1, 2007.*

*Primary Examiner* — Basia Ridley
*Assistant Examiner* — Kenneth Douyette
(74) *Attorney, Agent, or Firm* — Foley & Lardner LLP

(57) ABSTRACT

In one embodiment, an electrical power storage system using hydrogen includes a power generation unit generating power using hydrogen and oxidant gas and an electrolysis unit electrolyzing steam. The electrical power storage system includes a hydrogen storage unit storing hydrogen generated by the electrolysis and supplying the hydrogen to the power generation unit during power generation, a high-temperature heat storage unit storing high temperature heat generated accompanying the power generation and supplying the heat to the electrolysis unit during the electrolysis, and a low-temperature heat storage unit storing low-temperature heat, which is exchanged in the high-temperature heat storage unit and generating with this heat the steam supplied to the electrolysis unit.

17 Claims, 7 Drawing Sheets

U.S. PATENT DOCUMENTS

| | | |
|---|---|---|
| 4,952,533 A | 8/1990 | Hongu |
| 4,993,481 A | 2/1991 | Kamimoto et al. |
| 5,312,699 A | 5/1994 | Yanagi et al. |
| 2004/0081859 A1* | 4/2004 | McElroy et al. .................. 429/1 |
| 2007/0225151 A1* | 9/2007 | Suyama et al. ................. 501/88 |
| 2008/0000231 A1 | 1/2008 | Litwin et al. |
| 2008/0078501 A1 | 4/2008 | Li et al. |
| 2008/0131665 A1 | 6/2008 | Suyama et al. |

FOREIGN PATENT DOCUMENTS

| | | |
|---|---|---|
| JP | 04-349356 A | 12/1992 |
| JP | 2000-349137 A | 12/2000 |
| JP | 3253985 B2 | 2/2002 |
| JP | 2005-022905 A | 1/2005 |
| JP | 2006-134767 A | 5/2006 |
| JP | 2007-051328 A | 3/2007 |
| JP | 2007-132568 A | 5/2007 |
| JP | 2007-132569 A | 5/2007 |
| JP | 2008-014627 A | 1/2008 |
| JP | 2008-045152 A | 2/2008 |
| JP | 2008-071602 A | 3/2008 |
| JP | 2008-105927 A | 5/2008 |
| JP | 2008-137830 A | 6/2008 |
| WO | WO 2007/063272 A2 | 6/2007 |

* cited by examiner

ELECTRICAL POWER STORAGE SYSTEM USING HYDROGEN AND METHOD FOR STORING ELECTRICAL POWER USING HYDROGEN

CROSS-REFERENCE TO RELATED APPLICATIONS

This application is a continuation of prior International Application No. PCT/JP2010/000905 filed on Feb. 15, 2010, which is based upon and claims the benefit of priority from Japanese Patent Applications No. 2009-032494 filed on Feb. 16, 2009, No. 2009-051558 filed on Mar. 5, 2009, and No. 2010-026457 filed on Feb. 9, 2010; the entire contents of all of which are incorporated herein by reference.

FIELD

Embodiments described herein relate generally to an electrical power storage system using hydrogen and a method for storing electrical power using hydrogen.

BACKGROUND

In the case where there is a large difference in power consumption between the daytime and the nighttime or in the case of a power system with numerous interconnected wind power plants whose power generating capability varies depending on the wind condition, there is needed a power storage apparatus which stores surplus power in the nighttime or the like and discharges electricity during the daytime when the power goes short to correspond to a peak load, so as to effectively utilize a power generation facility. The most representative one is a pumped storage hydroelectric plant. In this plant, water is pumped to an upper dam during the nighttime to effectively store surplus power during the nighttime, and power is generated with a hydraulic turbine generator using the stored water in the daytime hours when a large power is consumed, so as to correspond to the peak load during the daytime.

The pumped storage hydroelectric plant has good responsiveness as a large power generation facility, and thus assumes the central role of equalizing loads of power systems. However, the power storage technology using the pumped storage hydroelectric plant is limited in geographical conditions such as whether it is possible to use a river or seawater, whether it is possible to build a dam, and so on. There is a further limitation that it is not applicable unless the input/output capacity of the system is 200 MW at the minimum.

As a relatively large power storage facility other than the pumped storage hydroelectric plant, power storage apparatuses using hydrogen are known. It is known that a power storage apparatus which includes electrolyzing and power generating means having a solid-oxide electrolyte and combines a steam electrolysis cell and a fuel cell. A solid electrolyte fuel cell can generate power by adding oxygen and hydrogen. Further, as backward reaction, it is also possible to apply voltage to the added steam to electrolyze it for obtaining oxygen and hydrogen. Utilizing this principle, steam is electrolyzed by surplus power to produce hydrogen, and the hydrogen is utilized to generate power when power is needed.

A common heat storage technique is known. It is known that an apparatus such that waste heat at 200° C. or lower is stored in a latent heat storage material such as sodium acetate 3-hydrate or magnesium chloride 6-hydrate, and heat is exchanged between the latent heat storage material and a heat medium for utilizing the waste heat. A heat storage technique applied to solar power generation is known, in which molten salts corresponding to respective temperatures of 649° C. or higher, 816° C. or higher, 927° C. or higher, and 982° C. or higher are used as a heat storage material. It is known that a heat storage unit in which a molten salt as a heat storage material is filled in a porous ceramic container.

In power storage apparatuses using hydrogen, heat which is generated mainly during power generation is utilized effectively, and it is important how to supply heat required for electrolysis. Heat obtained mainly during power generation is used for air conditioning. However, in an air conditioner application, heat can be supplied only in the vicinity, and demands for air conditioning do not always match the generated heat amount. Thus, the heat cannot always be utilized effectively. It is known that heat generated during power generation is stored in a heat accumulator, and the stored heat is used for generating hydrogen. Also in this case, it cannot be said that use efficiency of heat generated during power generation is always high.

Incidentally, in a power storage apparatus or a heat storage apparatus, ceramic members are used which excel in heat resistance, strength, toughness, and so on. Further, ceramic members are used in various apparatuses as a heat resistant member, abrasion resistant member, an abrasive, a precision machine member, and so on. In recent years, application mainly of nonoxide-based ceramic members of a silicon carbide (SiC), a silicon nitride ($Si_3N_4$), and the like is in progress to semiconductor manufacturing apparatus parts, parts for energy equipment of nuclear energy or a gas turbine, space structural parts, automotive parts such as engine parts and exhaust gas filters, heat exchanger parts, pump parts, mechanical sealing parts, bearing parts, sliding parts, and so on.

Ceramic members generally contract about 20% during sintering, and hence it is difficult to fabricate large parts and complicated shape parts with them. Accordingly, attempts have been made to prepare a plurality of ceramic members and couple them together to produce a large part or a complicated shape part. As a method to join ceramic members together, there has been proposed a method to join a plurality of ceramic members by using reaction sintering of a silicon carbide.

It is known that a method to join a plurality of ceramic members formed of a silicon carbide-silicon composite sintered body or the like via a silicon carbide-silicon composite material layer (joining layer). Also, after a plurality of ceramic members are joined together with an organic resin-based adhesive, the joined part is impregnated with molten silicon. The joining layer is formed of silicon carbide particles, which are based on reaction between carbon in the organic resin and the molten silicon, and a silicon phase existing in interstices among the particles.

Further, after a plurality of ceramic members are joined with an adhesive containing a silicon carbide powder, a carbon powder, and an organic resin, the joined part is impregnated with molten silicon. In this case, in addition to silicon carbide particles based on the silicon carbide powder in the adhesive, the joining layer contains silicon carbide particles based on reaction between carbon contents in the carbon powder and the organic resin and the molten silicon, and the silicon phase is made to exist in interstices among these silicon carbide particles. In either case, a thermosetting resin is used as the organic resin to be an adhering component and a viscous component in the adhesive.

By the joining method described above, a free silicon phase exists in interstices among the silicon carbide particles forming the joining layer (silicon carbide-silicon composite material layer), which improves denseness or mechanical properties of the joining layer. Thus, joining strength among a plurality of ceramic members can be enhanced. However, it is known that, since the adhesive use a thermosetting resin, it is necessary to cure the thermosetting resin by heat treatment when obtaining a shaped product made by preliminarily joining a plurality of ceramic members (a shaped product before being impregnated with molten silicon). The thermosetting resin becomes soft once while being heated, and thus it is possible that a displacement or the like occurs in a joined part of the shaped product, making it unable to keep its intended shape.

Therefore, so as to keep the shape of a preliminarily shaped product or, in particular, the shape of a joined part by using an adhesive during curing treatment for the thermosetting resin, it is necessary to fix the preliminary shaped product with a jig. The jig to fix the preliminary shaped product needs to be prepared corresponding to the shapes and sizes of various types of parts, and thus becomes a main cause to increase manufacturing costs and the number of manufacturing processes of ceramic composite members such as joined members. Further, even when the preliminary shaped product is fixed with a jig, the thickness of the joined part may be uncontrollable, and dispersion in thickness of the final joining part may occur, which decreases material properties including joining strength.

BRIEF DESCRIPTION OF THE DRAWINGS

FIG. 3 is cross-sectional views illustrating a first structural example of a capsule used in the high-temperature heat storage device illustrated in FIG. 2, where

FIG. 9 is a cross-sectional view illustrating manufacturing processes of a ceramic joined member (ceramic composite member) according to an embodiment, where

DETAILED DESCRIPTION

According to one embodiment, there is provided an electrical power storage system using hydrogen including a power generation unit generating power using hydrogen and oxidant gas, an electrolysis unit electrolyzing steam to generate hydrogen, a hydrogen storage unit storing hydrogen generated by the electrolysis and supplying the hydrogen to the power generation unit during power generation, a high-temperature heat storage unit storing first heat generated accompanying the power generation and supplying the first heat to the electrolysis unit during the electrolysis, and a low-temperature heat storage unit storing second heat, which is exchanged in the high-temperature heat storage unit and is lower than the temperature of the first heat stored in the high-temperature heat storage unit, and generating with the second heat the steam supplied to the electrolysis unit.

According to another embodiment, there is provided a ceramic joining material including a mixture containing a silicon carbide powder having a mean particle diameter in the range of 0.5 μm to 5 μm, a carbon powder having a mean particle diameter in the range of 0.3 μm to 3 μm and a room temperature setting resin having viscosity and adhesiveness, and a curing agent of the room temperature setting resin which cures the mixture, in which the volume ratio of the silicon carbide powder to all the powder components in the joining material is in the range of 18% to 60%.

Embodiments will be described with reference to the drawings. Note that the same or similar components are denoted by common numerals, and duplicated descriptions are omitted.

Figure 1:
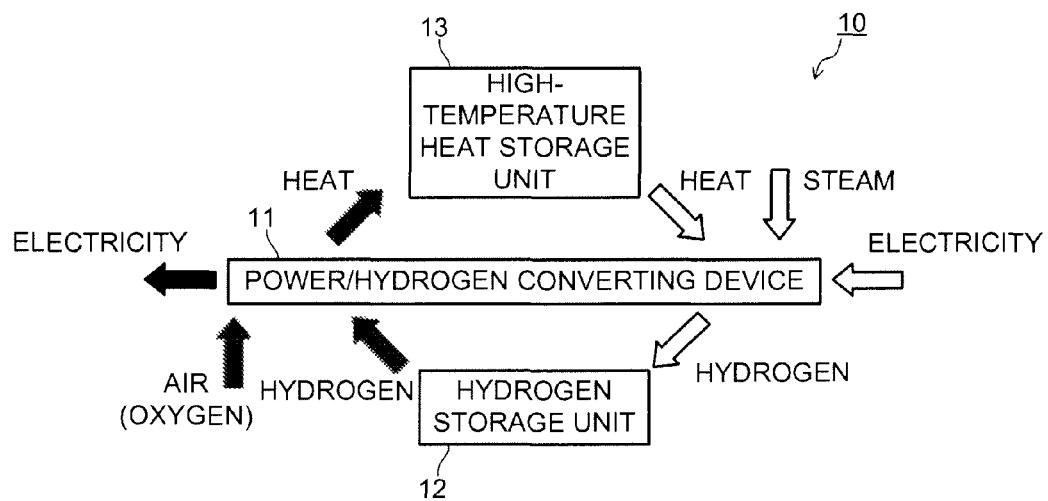
FIG. 1 is a block diagram schematically illustrating an electrical power storage system using hydrogen according to a first embodiment.

To begin with, a first embodiment of an electrical power storage system will be described. FIG. 1 is a block diagram schematically describing the structure of the electrical power storage system using hydrogen according to the first embodiment. The electrical power storage system (apparatus) 10 illustrated in FIG. 1 includes a power/hydrogen converting device 11. The power/hydrogen converting device 11 is an apparatus capable of performing power generation and electrolysis of steam (generation of hydrogen) while switching these operations over time. Specifically, it is formed of a solid electrolyte fuel cell having a solid-oxide electrolyte.

The solid electrolyte fuel cell combines a power generation unit generating power using hydrogen and oxidant gas, and an electrolysis unit electrolyzing steam. In FIG. 1, directions of flows of electricity (power), air (oxygen), hydrogen, heat in a power generation operating mode are denoted by black arrows, and directions of flows of electricity (power), steam, heat, hydrogen in an electrolysis operating mode are denoted by white arrows.

In the power generation operating mode, hydrogen is supplied to a hydrogen electrode (fuel electrode) of the power/hydrogen converting device (solid electrolyte fuel cell) 11, and oxidant gas (oxygen or air containing oxygen) is supplied to an oxidant electrode, thereby performing power generation. On the other hand, in the electrolysis (hydrogen generation) operating mode, steam is supplied to the hydrogen electrode side of the power/hydrogen converting device (solid electrolyte fuel cell) 11 and power is supplied simultaneously, thereby electrolyzing the steam to generate hydrogen.

The electrical power storage system 10 includes a hydrogen storage unit 12 storing hydrogen which is generated during the electrolysis (hydrogen generation) operating mode. As the hydrogen storage unit 12, for example, a hydrogen storage tank is used. The hydrogen stored in the hydrogen storage unit 12 is supplied to the hydrogen electrode (fuel electrode) of the power/hydrogen converting device (solid electrolyte fuel cell) 11 during the power generation operating mode.

The electrical power storage system 10 further includes a high-temperature heat storage unit 13 storing high temperature heat of 650° C. to 1000° C. generated in the power/hydrogen converting device 11 during the power generation operating mode. The high temperature heat stored in the high-temperature heat storage unit 13 is supplied to the power/hydrogen converting device 11 during the electrolysis operating mode. Since steam electrolysis is heat absorbing reaction, it is necessary to supply heat externally. Note that the electrical power storage system 10 includes, although omitted from illustration here, a low-temperature heat storage unit in addition to the high-temperature heat storage unit 13. Details of the high-temperature heat storage unit and the low-temperature heat storage unit will be described later.

In the electrical power storage system 10, generally, for example, steam electrolysis operation using power is performed during the nighttime when power demands are low and hydrogen is stored in the hydrogen storage unit 12. During the daytime when power demands are high, the hydrogen stored in the hydrogen storage unit 12 is used for performing a power generating operation. Heat generated during the power generating operation is stored in the high-temperature heat storage unit 13 through discharged steam or a heat medium which exchanged heat with the discharged steam. In the high-temperature heat storage unit 13, for example, heat of 650° C. to 1000° C. is stored.

During the electrolysis operation, water (steam) is supplied to the hydrogen electrode side of the power/hydrogen converting device (solid electrolyte fuel cell) 11. At this time, heat needed for the electrolysis operation is discharged from the high-temperature heat storage unit 13 via the steam or the heat medium. The temperature of the steam or heat medium discharging heat is 600° C. to 1000° C., for example. Hydrogen is generated and discharged by electrolysis of steam on the hydrogen electrode side, and this hydrogen is stored in the hydrogen storage unit 12. Concurrently, oxygen is generated and discharged on the oxygen electrode side.

Figure 2:
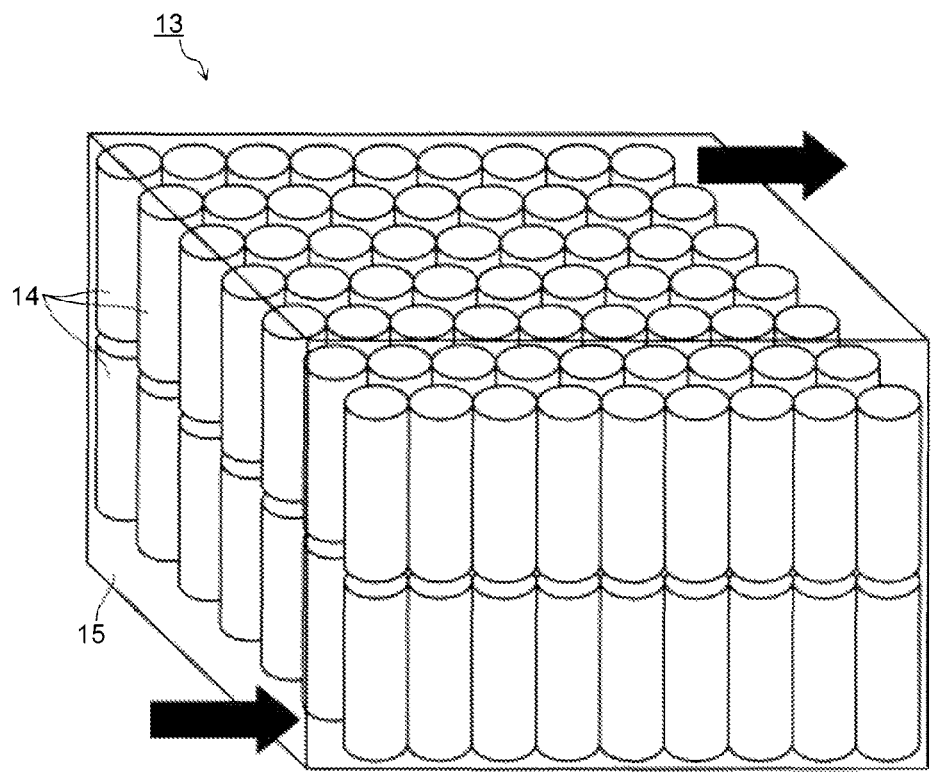
FIG. 2 is a perspective view illustrating an example of a high-temperature heat storage device in the electrical power storage system of the first embodiment.

A specific structural example of the high-temperature heat storage unit 13 will be described with reference to FIG. 2. FIG. 2 is a perspective view illustrating an example of a heat storage device forming the high-temperature heat storage unit 13 of the electrical power storage system 10 of the first embodiment. The high-temperature heat storage unit (heat storage device) 13 includes a plurality of capsules 14 in which a heat storage material is encapsulated, and a heat storage container 15 housing these capsules 14. The heat storage container 15 forms flow paths for a heat medium fluid flowing around the capsules 14.

The capsules 14 are cylindrical containers for example, in which a heat storage material (not illustrated) is encapsulated. The heat storage material used for the high-temperature heat storage unit 13 is one having a melting point to melt when storing heat and solidify when releasing heat, and it is preferred to have, for example, a melting point in the temperature range of 650° C. to 1000° C. with heat of solution of 200 kJ/kg or higher and specific heat of solid and liquid of 1 kJ/kg·K or higher. It is preferred that the capsules 14 have corrosive resistance to the encapsulated heat storage material and conductivity of heat of 650° C. to 1000° C. at 10 W/m·K or higher.

During the power generating operation, steam at a high temperature of 650° C. to 1000° C. for example obtained by the heat generated in the power/hydrogen converting device 11 or the heat medium fluid which exchanged heat with this steam is introduced into the heat storage container 15 and flows outside the capsules 14. Thus, the capsules 14 and the heat storage material in a solid state encapsulated therein are heated. The heat storage material is heated and melted, and changes from solid to liquid. By utilizing latent heat during this phase transition from solid to liquid, a large amount of heat can be stored in a relatively small amount of heat storage material.

During the electrolysis operation, the high temperature heat generated when the heat storage material in a liquid state solidifies is transferred to the heat medium fluid via the capsules 14. By sending this high-temperature heat medium fluid to the power/hydrogen converting device 11, necessary heat can be supplied during the electrolysis operation. In this case, the heat medium fluid such as steam is not in direct contact with a molten salt or the like as the heat storage material and passes through the flow paths outside the capsules 14.

As the heat storage material used for the high-temperature heat storage unit 13, at least one selected from sodium chloride (NaCl), potassium chloride (KCl), magnesium chloride ($MgCl_2$), calcium chloride ($CaCl_2$), lithium fluoride (LiF), sodium fluoride (NaF), lithium carbonate ($Li_2CO_3$), sodium carbonate ($Na_2CO_3$), potassium carbonate ($K_2CO_3$), and lithium hydroxide (LiH) is exemplified. These may also be used in a mixture.

Depending on the type of the solid electrolyte of the power/hydrogen converting device (solid electrolyte fuel cell) 11 or on operating conditions, the temperature of the heat discharged during power generation differs. Thus, it is preferred that the type of the heat storage material be selected depending on the temperature of discharged heat and a heat storage capacity. By using a single one of the above-described chemical compounds (molten salts), it is possible to suppress variation in heat storage/discharge characteristics, which becomes a problem in relation with varying temperatures and enlargement of apparatus. Thus, stability of the electrical power storage system 10 can be improved.

It is preferred that the capsules 14 be formed of at least one ceramic member selected from a silicon carbide (SiC) sintered body, a silicon carbide-silicon (SiC—Si) composite sintered body, a silicon carbide-based long fiber (SiC-long fiber (SiC long fiber or the like)) composite material, a boron carbide ($B_4C$) sintered body, a silicon nitride ($Si_3N_4$) sintered body, a boron nitride (BN) sintered body, and graphite (C). With the capsules 14 formed of a ceramic member, heat transfer between the heat storage material and the steam or heat medium fluid can be improved, and weight reduction and size reduction of the heat storage device as well as improvement in overall efficiency can be achieved.

The capsules 14 are formed of a first and a second ceramic member, at least one of which has a container shape. A specific example of the ceramic members is as described above. FIG. 3 illustrates a first structural example of the capsules 14. The capsule 14 illustrated in FIG. 3 has a first ceramic member 16 having a container shape and a second ceramic member 17 having a lid shape. In addition, both the first ceramic member 16 and the second ceramic member 17 may have a container shape. For encapsulating the heat storage material in such a capsule 14, there is a method as follows.

Figure 3A:
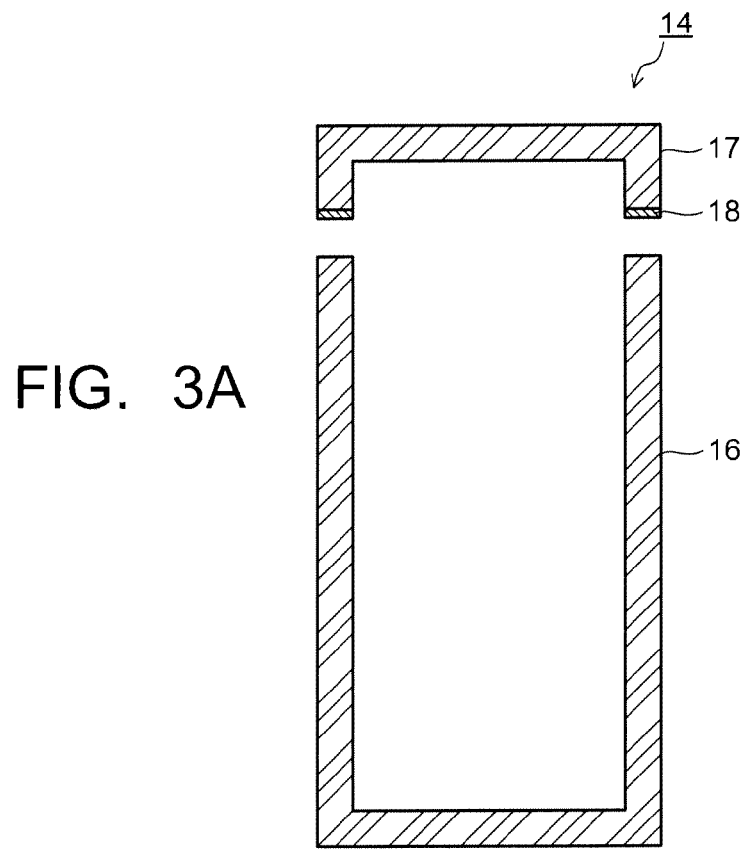
FIG. 3A is a cross-sectional view illustrating a state before a first ceramic member and a second ceramic member are joined.
Figure 3B:
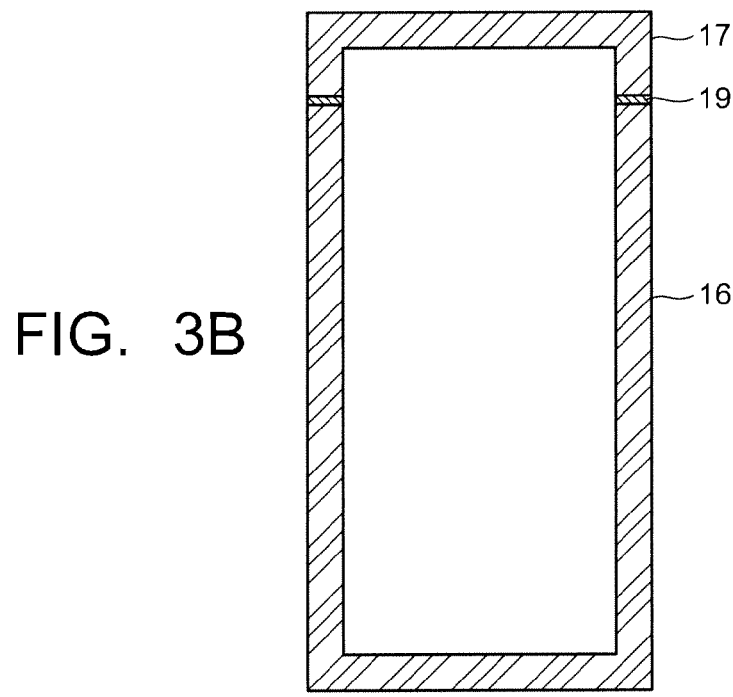
FIG. 3B is a cross-sectional view illustrating a state that the first ceramic member and the second ceramic member are joined.

First, as illustrated in FIG. 3A, on an opening of the first ceramic member 16 in which the heat storage material (not illustrated) is housed, the second ceramic member 17 is disposed via a joining material 18. As the joining material 18, a ceramic precursor, a carbon adhesive, a silicon brazing material, or the like is used. It is possible to apply a silicon carbide-silicon composite body or the like to join the first ceramic member 16 and the second ceramic member 17. Next, as illustrated in FIG. 3B, heat treatment at temperatures corresponding to the joining material 18 is performed, thereby joining the first ceramic member 16 and the second ceramic member 17 via a joining layer 19.

As the ceramic precursor, a polycarbosilane, a polycarbosilazane, a polysilazane, a polyborosiloxane, a polymetaloxane, or the like is used. After firing, these precursors generate a ceramic layer formed of a Si—C-based ceramic, a Si—C—N-based ceramic, a Si—O-based ceramic, a Si—B—C-based ceramic, or the like as the joining layer 19. The carbon adhesive contains a graphite powder and a resin or the like, and after firing, a carbon layer is generated as the joining layer 19. As the silicon brazing material, a foil, a paste, or the like is used, and after firing (after brazing), these materials form a silicon layer as the joining layer 19.

A joining method applying a silicon carbide-silicon composite body is such that an adhesive containing carbon components such as a carbon adhesive or an organic resin-based adhesive is used as the joining material 18 to join the first ceramic member 16 and the second ceramic member 17, and thereafter heat treatment is performed with silicon (Si) being present to form the joining layer 19 formed of a silicon carbide-silicon composite body, thereby joining the first ceramic member 16 and the second ceramic member 17. The silicon is supplied by, for example, impregnating the joining layer (joining material 18) with molten silicon. At this moment, a part of the molten silicon is actively left, so as to form the joining layer 19 of a silicon carbide-silicon composite body.

The heat storage material is encapsulated in the capsule 14 formed by joining the first ceramic member 16 and the second ceramic member 17. When the heat storage material is encapsulated in the capsule 14, if joining with high density and strength is not made, there arises a problem such as a leak of the heat storage material from the joining part. Further, when there is a difference in thermal physical property between the ceramic members 16, 17 combining a heat transfer tube and the joining part, damage or the like originating in the joining part occurs easily due to a thermal cycle while storing/discharging heat. The joining layers 19 described above are all dense and strong, and also has excellent thermal physical properties. Thus, it is possible to prevent a leak of the heat storage material from the joining part, damage or the like originating in the joining part, and the like. Therefore, a heat storage device having stable heat storage/discharge characteristics can be obtained.

It is preferred to apply a silicon carbide-silicon composite body for the joining layer 19 between the first ceramic member 16 and the second ceramic member 17. It is preferred that the silicon carbide-silicon composite body forming the joining layer 19 have a structure having silicon carbide particles and a silicon phase which exists continuously in a network form in interstices among the silicon carbide particles. Such a silicon carbide-silicon composite body can be formed by impregnating a porous body having first silicon carbide particles and carbon with molten silicon, causing the carbon in the porous body to react with the molten silicon to generate second silicon carbide particles, and leaving part of the molten silicon as the silicon phase.

The porous body having the first silicon carbide particles and carbon is formed as follows for example. First, as the joining material 18, there is prepared a viscous material containing a silicon carbide powder to be the first silicon carbide particles, a carbon powder, and a room temperature setting resin and a curing agent thereof (joining material). It is preferred that the silicon carbide powder have a mean particle diameter in the range of 0.5 µm to 5 µm. It is preferred that the carbon powder have a mean particle diameter in the range of 0.3 µm to 3 µm. Further, it is preferred that the volume ratio of the silicon carbide powder to all the powder components in the viscous material be in the range of 18% to 60%, and that the total mass ratio of the silicon carbide powder and the carbon powder be in the range of 29% to 55% of the entire viscous material. Reasons for the limitations in these numbers will be described later.

Next, on the opening of the first ceramic member 16 in which the heat storage material (not illustrated) is housed, the second ceramic member 17 is disposed via the joining material 18 formed of the above-described viscous material. A silicon foil or the like can be used as a supply source of the molten silicon. When the viscous material is applied on a joining face of the second ceramic member 17, the silicon foil is disposed on a joining face of the first ceramic member 16 in a manner to contact the viscous material. Alternatively, when the viscous material is disposed between the first ceramic member 16 and the second ceramic member 17, the silicon foil may be disposed around them in a manner of wrapping them. When the viscous material and the silicon foil are in contact, the molten silicon can be supplied sufficiently into the porous body during heat treatment.

Next, the room temperature setting resin in the viscous material is cured under room temperature and becomes a solidified body. This results in preliminary joining of the first ceramic member 16 and the second ceramic member 17, and thus spilling of the heat storage material or the like can be prevented while being transferred to a heat treatment furnace or handled. Subsequently, by performing heat treatment to the solidified body of the viscous material, a cured product of the room temperature setting resin is carbonized. This causes the solidified body of the viscous material to be porous. Then, the joining layer 19 formed of the silicon carbide-silicon composite body is formed by impregnating such a porous body with molten silicon, causing the carbon in the porous body to react with the molten silicon to generate second silicon carbide particles, and leaving part of the molten silicon as the silicon phase. Note that details of conditions for forming the joining layer 19 formed of the silicon carbide-silicon composite body will be described later.

Figure 4:
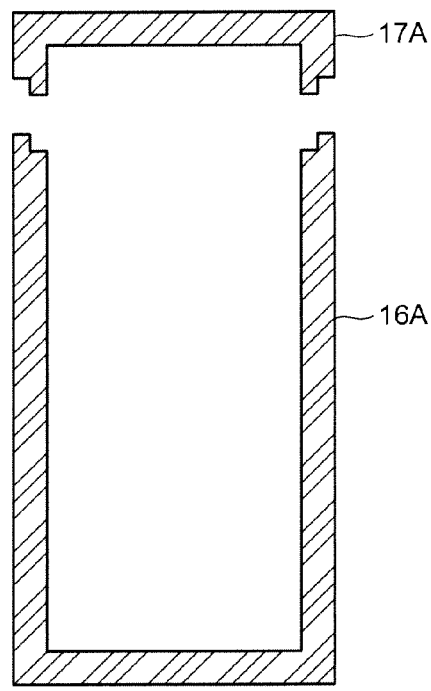
FIG. 4 is a cross-sectional view illustrating a second structural example of a capsule used in the high-temperature heat storage device illustrated in FIG. 2.
Figure 5:
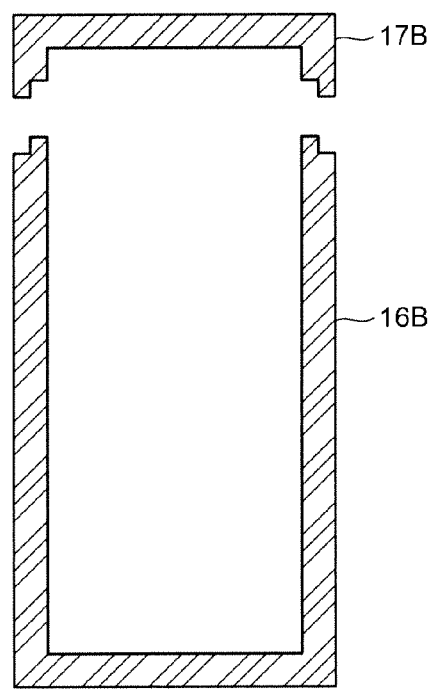
FIG. 5 is a cross-sectional view illustrating a third structural example of a capsule used in the high-temperature heat storage device illustrated in FIG. 2.

The shapes of the first and second ceramic members 16, 17 forming the capsules 14 are not limited to the shape illustrated in FIG. 3. It is also effective to make the shapes of the joining faces of the first ceramic member 16 having a container shape and the second ceramic member 17 having a lid shape to be engaging shapes as illustrated in FIG. 4 and FIG. 5. FIG. 4 and FIG. 5 illustrate joining faces such that projections are provided on the joining face of the second ceramic member 17, and recesses corresponding to the projections are provided on the joining face of the first ceramic member 16. With such shapes of the joining faces, a leak or the like of the heat storage material encapsulated in the capsules 14 can be prevented more securely.

Regarding renewable energy such as solar energy and wind power in a region where the weather changes largely, employing an electrical power storage system having a solid electrolyte fuel cell which performs power generation and steam electrolysis is effective for improving power storage efficiency. Also regarding renewable energy such as solar energy in a region where there is less variation in nighttime power and weather, employing an electrical power storage system having a solid electrolyte fuel cell which performs power generation and steam electrolysis is effective for improving power storage efficiency. The electrical power storage system 10 of this embodiment stores heat of 650° C. to 1000° C. discharged during power generation and uses this heat during electrolysis of steam, and thus the stored heat can be utilized effectively. Therefore, the overall efficiency of the electrical power storage system can be increased largely.

Figure 6:
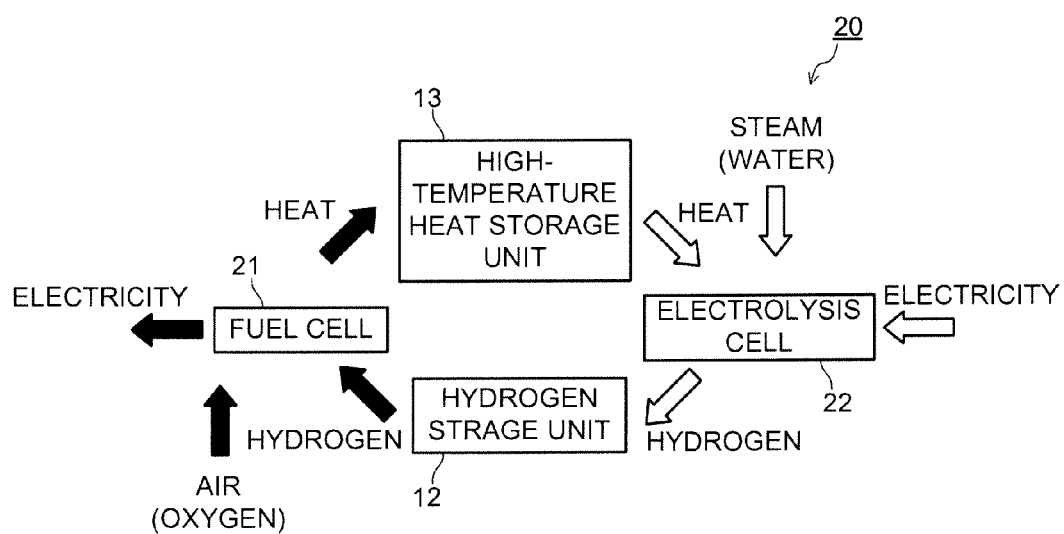
FIG. 6 is a block diagram schematically illustrating an electrical power storage system using hydrogen according to a second embodiment.

Next, a second embodiment of an electrical power storage system using hydrogen will be described. FIG. 6 is a block diagram schematically illustrating the structure of the electrical power storage system according to the second embodiment. The electrical power storage system 20 illustrated in FIG. 6 includes a power generation unit 21 which generates power using hydrogen and oxidant gas, and an electrolysis unit 22 which electrolyzes steam. For the power generation unit 21, for example, a solid electrolyte fuel cell having a solid-oxide electrolyte is employed. For the electrolysis unit 22, a steam electrolysis cell including a solid-oxide electrolyte is employed. The steam electrolysis cell forming the electrolysis unit 22 is a device which is separate from the solid electrolyte fuel cell forming the power generation unit 21.

In the second embodiment, the part corresponding to the power/hydrogen converting device 11 in the first embodiment is separated into the fuel cell which performs power generation (power generation unit 21) and the steam electrolysis cell which electrolyzes steam (electrolysis unit 22), which are formed of separated devices respectively. The other structure is the same as that of the first embodiment. In the second embodiment, switching of operating mode between power generation and steam electrolysis as in the first embodiment is unnecessary, thereby allowing to perform more flexible power generation and steam electrolysis. Accordingly, it is possible to more flexibly correspond to variation in power demand or the like, which contributes to stable supply of power. Moreover, similarly to the first embodiment, the overall efficiency of the electrical power storage system which effectively utilizes heat can be improved.

Figure 7:
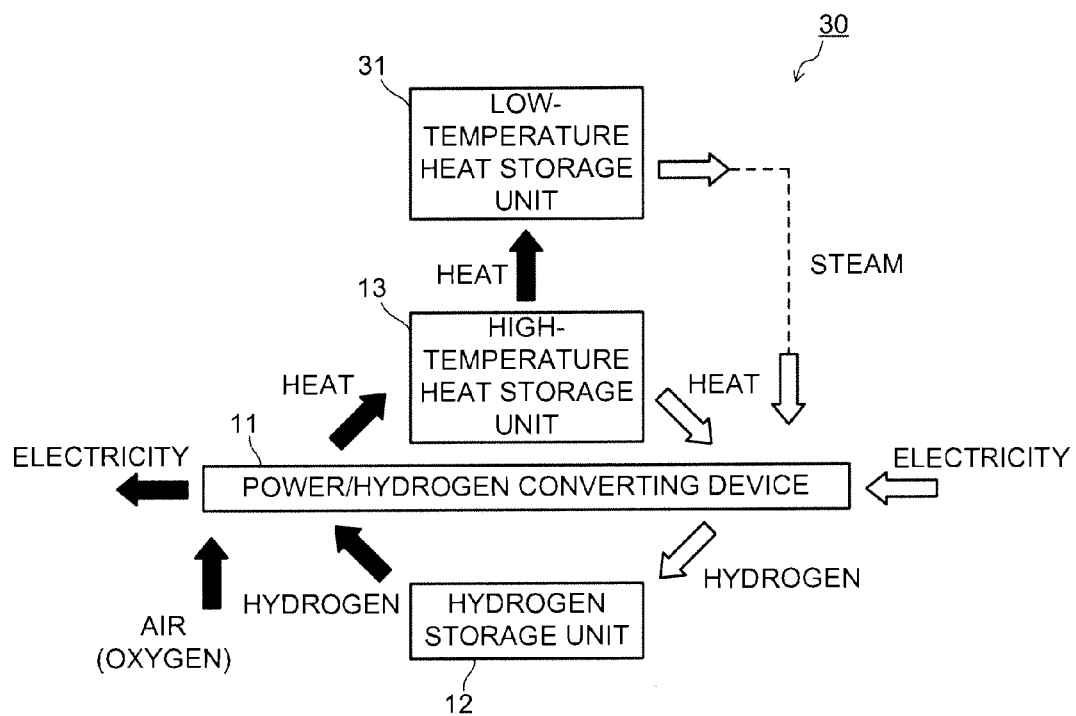
FIG. 7 is a block diagram schematically illustrating an electrical power storage system using hydrogen a third embodiment.

Next, a third embodiment of an electrical power storage system using hydrogen will be described. FIG. 7 is a block diagram schematically illustrating the structure of the electrical power storage system according to the third embodiment. The third embodiment illustrates an electrical power storage system 30 including a high-temperature heat storage unit 13 and a low-temperature heat storage unit 31. The electrical power storage system 30 of the third embodiment includes the low-temperature heat storage unit 31 in addition to the high-temperature heat storage unit 13 of the first embodiment.

In the electrical power storage system 30 of the third embodiment, heat generated in the power/hydrogen converting device 11 during power generation is stored in the high-temperature heat storage unit 13 via steam or a heat medium which exchanged heat with this steam. In the high-temperature heat storage unit 13, heat of 650° C. to 1000° C. is stored. Further, heat of 100° C. to 600° C. after being exchanged in the high-temperature heat storage unit 13 is stored in the electrical power storage system 30 via steam or a heat medium which exchanged heat with this steam.

During electrolysis of steam, steam is generated by evaporating water with heat discharged from the low-temperature heat storage unit 31, and this steam is supplied to the hydrogen electrode side of the power/hydrogen converting device 11. Moreover, heat needed during electrolysis of steam is supplied by discharging from the high-temperature heat storage unit 13 via steam or a heat medium. The temperature of the steam or heat medium discharging heat is 600° C. to 900° C., for example. Hydrogen is generated and discharged by electrolysis of steam on the hydrogen electrode side of the power/hydrogen converting device 11, and this hydrogen is stored in the hydrogen storage unit 12. Concurrently, oxygen is generated and discharged on the oxygen electrode side.

For the low-temperature heat storage unit 31, a heat storage device having a structure similar to that of the high-temperature heat storage unit 13 illustrated in FIG. 2 is employed. As the heat storage material used for the low-temperature heat storage unit 31, it is preferred to use an organic matter or a molten salt having a melting point in a temperature range of 100° C. to 200° C., with heat of solution of 150 kJ/kg or higher, and specific heat of solid and liquid of 1 kJ/kg·K or higher. Examples of the organic matter forming such a heat storage material include xylitol, erythritol, mannitol, sorbitol, alditol, urea, and the like. Examples of the molten salt include aluminum chloride ($AlCl_3$), iron chloride ($FeCl_3$), lithium hydroxide (LiOH), sodium hydroxide (NaOH), potassium hydroxide (KOH), sodium nitrite ($NaNO_2$), lithium nitrate ($LiNO_3$), sodium nitrate ($NaNO_3$), potassium nitrate ($KNO_3$), and the like.

Figure 8:
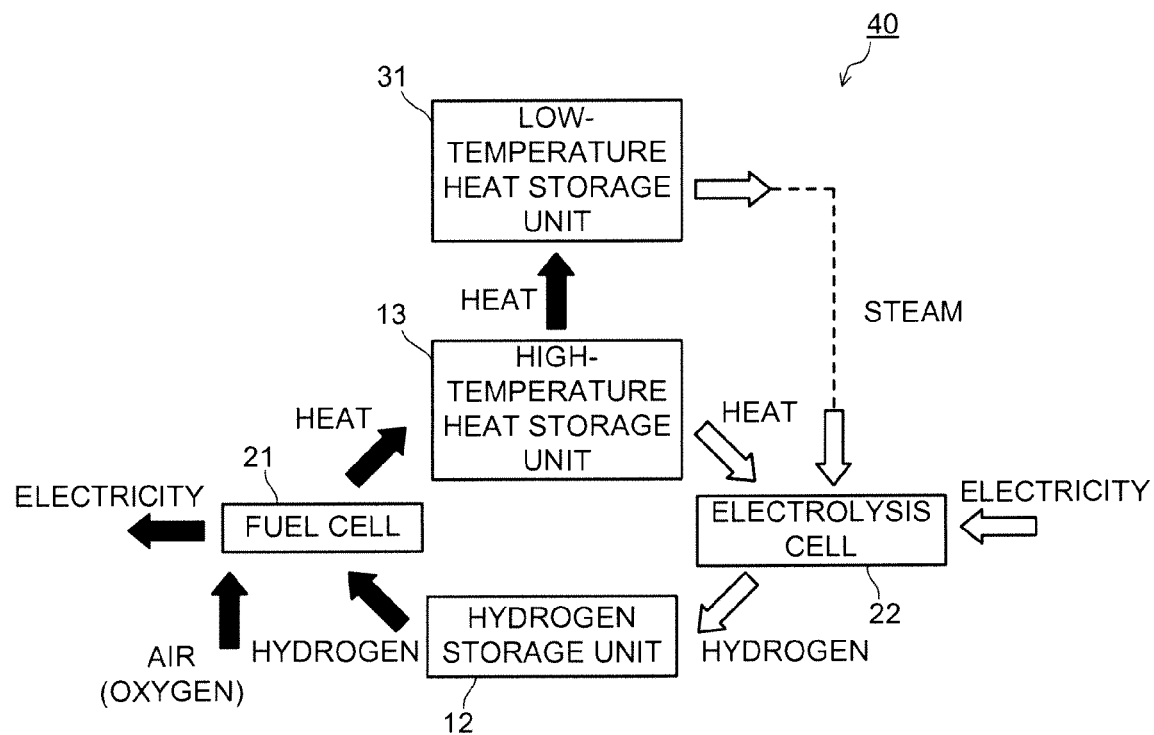
FIG. 8 is a block diagram schematically illustrating an electrical power storage system using hydrogen according to a fourth embodiment.

Next, a fourth embodiment of an electrical power storage system using hydrogen will be described. FIG. 8 is a block diagram schematically illustrating the structure of the electrical power storage system according to the fourth embodiment. The electrical power storage system 40 of the fourth embodiment includes, similarly to the second embodiment, a power generation unit (solid electrolyte fuel cell including a solid-oxide electrolyte) 21 and an electrolysis unit (steam electrolysis cell including a solid-oxide electrolyte) 22 which is separate from the power generation unit. The other structure is the same as that of the third embodiment.

The electrical power storage system 40 of the fourth embodiment has characteristics of both the second embodiment and the third embodiment. In the fourth embodiment, switching of operating mode between power generation and electrolysis as in the third embodiment is unnecessary, thereby allowing to perform more flexible power generation and electrolysis. Accordingly, it is possible to more flexibly correspond to variation in power demand or the like, which contributes to stable supply of power. Moreover, since the low-temperature heat storage unit 31 is provided in addition to the high-temperature heat storage unit 13 similarly to the third embodiment, the overall efficiency of the electrical power storage system which effectively utilizes heat improves further.

The above-described embodiments exemplify the electrical power storage system of the present invention, and the present invention is not limited thereto. For example, the structure of the low-temperature heat storage unit 31 in the third and fourth embodiments may be one not similar to the high-temperature heat storage unit 13 illustrated in FIG. 2. Extensions or modifications can be made within the range of the technical idea of the present invention, for example the structure of a latent heat storage device can be applied to the low-temperature heat storage unit 31, and such extended or modified embodiments are included in the technical scope of the present invention.

Next, an embodiment of a ceramic joining material and a manufacturing method of a ceramic composite member using the ceramic joining material will be described. The manufacturing method of a ceramic composite member (joining method of ceramic members) according to this embodiment is applied to a forming method of the capsules 14 (joining method of the first ceramic member 16 and the second ceramic member 17) in the above-described embodiments of the electrical power storage system, and specifies specific conditions and the like in this application. However, the ceramic joining material and the manufacturing method of the ceramic composite member of this embodiment are not limited thereto and are applicable to joining or repair of various ceramic bodies.

The ceramic joining material of this embodiment includes a first component formed of a mixture containing a silicon carbide powder, a carbon powder, and a room temperature setting resin, and a second component formed of a curing agent which cures the first component (mixture) (curing agent which cures the room temperature setting resin). The ceramic joining material as a viscous material prepared by mixing the first component and the second component is used for joining or repair of ceramic bodies. That is, as a mixture (viscous material) of the first component and the second component, the ceramic joining material is used for manufacturing a ceramic joined member formed by joining a plurality of ceramic bodies or a ceramic composite member such as a ceramic repaired member in which a part of a ceramic body is repaired.

Examples of the ceramic bodies for which the ceramic joining material is applied for joining or repair include molded bodies or sintered bodies of silicide ceramics such as silicon carbides, silicon nitrides, and complex chemical compounds mainly containing them. Further, the material is also applicable to ceramics other than the silicide ceramics and is effective for carbide ceramics such as boron carbides and graphite. Specific examples of ceramic bodies include a silicon carbide-carbon composite molded body, a silicon carbide-silicon composite sintered body, a silicon carbide sintered body, a silicon nitride sintered body, and graphite. The ceramic joining material is particularly effective for silicon carbide-based ceramic bodies.

The ceramic joining material of this embodiment forms a silicon carbide (SiC)-silicon (Si) composite body through a shaping process, a heat treatment process, an impregnation process of molten silicon, and so on, which will be described later. The SiC—Si composite body includes first SiC particles based on the silicon carbide powder in the joining material, second SiC particles generated by reaction between the carbon components (porous carbon generated by performing heat treatment (carbonization treatment) on a carbon powder and a cured product of a room temperature setting resin) in the joining material and the molten silicon, and a Si (free Si phase) filling interstices among the first and second SiC particles. Such a SiC—Si composite body forms a joining part which joins a plurality of silicon-based ceramic bodies or a repair part for repairing a part of a silicon-based ceramic body.

The first component of the ceramic joining material is formed of a mixture containing a room temperature setting resin as a component to add adhesiveness and viscosity, and the second component is formed of a curing agent which cures the first component (mixture). The room temperature setting resin and the curing agent form a room temperature setting resin composition, for which an epoxy-based resin composition or a phenol-based resin composition having a room temperature setting property is used. The room temperature setting resin composition is separated into two components of a base resin, whose main component is the room temperature setting resin, and a curing agent, which are mixed to be used just before working with it. In the ceramic joining material, for example, a silicon carbide powder, a carbon powder, and the base resin of the room temperature setting resin composition are mixed (first component) in advance, and then the curing agent (second component) is blended therewith to be used for joining or repairing ceramic bodies.

In the room temperature setting epoxy-based resin composition, the base resin contains, as a main component of the epoxy-based resin composition, an epoxy resin of bisphenol-A type, bisphenol-F type, cresol-novolac type, phenol-novolac type, high polymer type, epoxy polyol, or the like. In addition to the epoxy resin, the base resin generally contains an inorganic filler of silica, alumina, talc, clay, mica, quartz powder, titanium oxide, calcium carbonate, or the like. In addition, the silicon carbide powder and the carbon powder in the first component correspond to part of the inorganic filler in the resin composition. Further, the base resin may contain various fillers and additives, such as a hardening accelerator, a coloring agent, a coupling agent, and the like which are normally added to an epoxy-based resin composition, as well as a solvent or the like for dilution. Therefore, the first component of the joining material may contain fillers and additives, such as an inorganic filler, a hardening accelerator, a coloring agent, a coupling agent, and the like as well as a solvent or the like for dilution, in addition to the room temperature setting epoxy resin.

Examples of the curing agent in the room temperature setting epoxy-based resin composition include an acid anhydride, a polyamine, a polyamide, a novolac resin, an epichlorohydrin, and the like. The amount of the curing agent (amount with respect to the epoxy resin in the base resin) is set appropriately according to its type and hardening reaction mechanism under room temperature, and further a hardening degree of the viscous material under room temperature, and so on. Such a curing agent of the room temperature setting epoxy resin is used as the second component of the joining material.

In the room temperature setting phenol-based resin composition, the base resin contains, as a main component of the phenol-based resin composition, a phenol resin such as a novolac, a resole, or the like. In addition to the phenol resin, the base resin generally contains an inorganic filler of silica, alumina, talc, clay, mica, quartz powder, titaniumoxide, calcium carbonate, or the like. Further, the base resin may contain various fillers and additives, such as a hardening accelerator, a coloring agent, a coupling agent, and the like which are normally added to a phenol-based resin composition, as well as a solvent or the like for dilution. Therefore, the first component of the joining material may contain fillers and additives, such as an inorganic filler, a hardening accelerator, a coloring agent, a coupling agent, and the like as well as a solvent or the like for dilution, in addition to the room temperature setting phenol resin.

Examples of the curing agent in the room temperature setting phenol-based resin composition include an acid anhydride, a polyamine, a polyamide, and the like. The amount of the curing agent (amount with respect to the phenol resin in the base resin) is set appropriately according to its type and hardening reaction mechanism under room temperature, and further a hardening degree of the viscous material under room temperature, and so on. Such a curing agent of the room temperature setting phenol resin is used as the second component of the joining material.

The ceramic joining material of this embodiment is such that a silicon carbide powder and a carbon powder are mixed with the base resin of the room temperature setting resin composition (first component), and a curing agent (second component) is mixed with this mixture to prepare a viscous material (mixture of the first component and the second component) to be used. The ceramic joining material has a resin component formed of a room temperature setting resin (fluid resin component such as a liquid resin component), and a powder component based on the silicon carbide powder and the carbon powder. The powder component in the ceramic joining material means the silicon carbide powder and the carbon powder, and does not include a powder component blended in advance in the room temperature setting resin.

The silicon carbide powder blended in the first component of the ceramic joining material has a mean particle diameter in the range of 0.5 μm to 5 μM. When the mean particle diameter of the silicon carbide powder is smaller than 0.5 μm, a distribution state of respective components (carbon contents based on the silicon carbide powder, the carbon powder, and the resin) in a porous body formed by heat treating the mixture (viscous material) of the first component and the second component and a distribution state of components (the second SiC particles and the Si phase) in the SiC—Si composite body formed by impregnating the porous body with molten Si become non-uniform. On the other hand, when the mean particle diameter of the silicon carbide powder is larger than 5 μM, the size of the Si phase tends to be too large. In either case, it is not possible to increase the strength of the SiC—Si composite body.

The carbon powder has a mean particle diameter in the range of 0.3 μm to 3 μm. When the mean particle diameter of the carbon powder is smaller than 0.3 μm, flocculation occurs easily, and the distribution state of the second SiC particles and the Si phase in the SiC—Si composite body becomes non-uniform. When the mean particle diameter of the carbon powder is larger than 3 μm, a chalking phenomenon occurs easily, and the strength of the SiC—Si composite body decreases. Here, the chalking phenomenon is such that a dense SiC layer is formed on a surface side due to volume increase during generation of SiC by reaction with molten silicon, and permeation of the molten silicon to the inside is hindered, resulting in that the carbon inside remains unchanged. Further, when the mean particle diameter of the carbon powder is too large, the mean diameter of the Si phase tends to be large, leading to decrease or dispersion in strength of the SiC—Si composite body forming the joining part or the repair part.

It is preferred that the ceramic joining material contain the silicon carbide powder in the range of 18 volume % to 60 volume % with respect to the total powder component. When the volume ratio of the silicon carbide powder is lower than 18 volume %, the first SiC particles which functions as aggregate in the SiC—Si composite body become insufficient, and the distribution state of the second SiC particles and the Si phase can easily become non-uniform. On the other hand, when the volume ratio of the silicon carbide powder is higher than 60 volume %, the Si phase in the SiC—Si composite body becomes too large. In either case, there is a concern that the strength of the SiC—Si composite body cannot be exhibited sufficiently. It is preferred that the volume ratio of the silicon carbide powder to the total powder component be in the range of 22% to 56%.

It is preferred that the total content of the silicon carbide powder and the carbon powder in the ceramic joining material be in the range of 29 mass to 55 mass % of the entire material. By applying such a content of the powder component (the silicon carbide powder and the carbon powder), when the joining part joining a plurality of ceramic bodies or the repair part for repairing a part of a ceramic body are formed, it is possible to obtain a viscous material (the mixture of the first component and the second component of the ceramic joining material) by which joining parts or repair parts of various shapes and sizes can be easily shaped. That is, formability (workability) of the joining part and the repair part with the ceramic joining material can be increased.

When the total content of the powder component formed of the silicon carbide powder and the carbon powder is higher than 55 mass %, the mixture (viscous material) of the first component and the second component of the ceramic joining material tends to be too high. Further, when the total content of the powder component is less than 29 mass %, conversely there is a concern that the viscosity of the mixture (viscous material) of the first component and the second component becomes too low. In either case, workability (formability) of the mixture (viscous material) of the first component and the second component decreases. It is more preferred that the total content of the silicon carbide powder and the carbon powder in the ceramic joining material be in the range of 29 mass % to 40 mass %.

Further, when ceramic bodies to be joined or repaired are a dense material like a sintered body, it is preferred to use the ceramic joining material with a relatively large content of the powder component (joining material whose content of the powder component is on the 55 mass % side). Conversely, when the ceramic bodies are porous like a molded body such as a green compact or the like, it is preferred to use the ceramic joining material with a relatively small content of the powder component (joining material whose content of the powder component is on the 29 mass % side).

When the powder component amount of the ceramic joining material is relatively large (the content of the powder component is on the 55 mass % side), the shape retention of the mixture (viscous material) of the first component and the second component becomes high, and it is easy to be joined to a ceramic body. However, when the ceramic bodies are porous like a green compact, a resin component (liquid component) is absorbed into the ceramic bodies, and thus, for example, the ceramic bodies become difficult to be joined together. In such a case, it is preferred to use the ceramic joining material with a relatively small powder component amount (the joining material whose content of the powder component is on the 29 mass % side). With such a joining material, the mixture (viscous material) of the first component and the second component cut into recess portions on the surface of a green compact, thereby improving the adhesiveness.

Regarding the ceramic joining material of this embodiment, the viscous material prepared by mixing the first component and the second component is given moderate viscosity based on the fluidity (liquidity or the like) which the room temperature setting resin has, the blending amount of the powder component, and the like, and thus it can be shaped easily on a joining face or a repair face of a ceramic body. Further, since the viscous material formed of the mixture of the first component and the second component hardens under room temperature, a predetermined shape required for the joining part or the repair part can be maintained easily. Therefore, by using the ceramic joining material of this embodiment, it is possible to easily and precisely form the joining part or the repair part on ceramic bodies of various shapes and sizes, in particular, ceramic bodies forming a large structural member or a complicated shape member.

Next, with reference to FIG. 9, a manufacturing method of a ceramic composite member according to the embodiment will be described. FIG. 9 is a cross-sectional view illustrating a manufacturing method of a ceramic joined member to which the manufacturing method is applied. Note that a manufacturing method of a ceramic repaired member to which the manufacturing method is applied is implemented by applying the same processes as the manufacturing method of the joined member except that the mixture (viscous material) of the first component and the second component of the ceramic joining material is disposed on a repair position of a ceramic body. Here, mainly the manufacturing method of the joined member will be described.

Figure 9A:
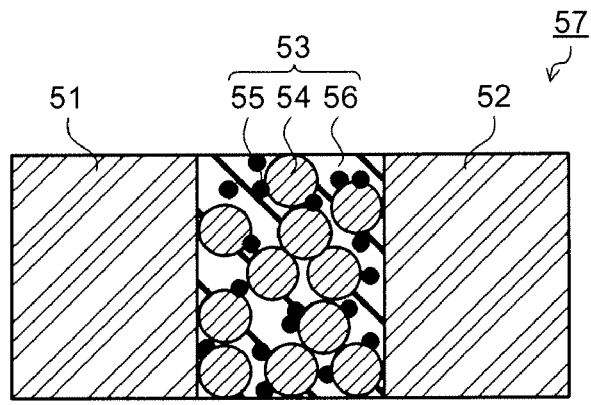
FIG. 9A is a cross-sectional view illustrating a state that the first ceramic body and a second ceramic body are joined with a viscous material.

FIG. 9 illustrates manufacturing processes of the ceramic joined member according to the embodiment. First, as illustrated in FIG. 9(a), a first and a second ceramic body 51, 52 are prepared as members to be joined (base members). Here, although steps to join the two ceramic bodies 51, 52 are described, there may be three or more ceramic bodies as members to be joined (base members). When this embodiment is applied to the manufacturing method of the ceramic repaired member, a ceramic body which needs repair (basically one ceramic body) is prepared.

It is preferred that the first and second ceramic bodies 51, 52 be molded bodies or sintered bodies of silicide ceramics such as silicon carbides, silicon nitrides, and complex chemical compounds mainly containing them or carbide ceramics such as graphite as described above. It is preferred that the first and second ceramic bodies 51, 52 be at least one selected from a silicon carbide-carbon composite molded body, a silicon carbide-silicon composite sintered body, a silicon carbide sintered body, a silicon nitride sintered body, and graphite. The first and second ceramic bodies 51, 52 may either be the same kinds of ceramic bodies or different kinds of ceramic bodies. One of the first and second ceramic bodies 51, 52 may be a molded body and the other may be a sintered body.

A joining process of this embodiment is particularly preferable for joining silicon carbide-carbon composite molded bodies together, joining silicon carbide-silicon composite sintered bodies together, and joining silicon carbide sintered bodies together, and can obtain better results in such cases (results of improvement in joining strength, strength in a ceramic joined member (composite member) including a joining part, and the like). This is the same when applying this embodiment to the manufacturing method of the ceramic repaired member, and better results can be obtained when it is applied to repair of a silicon carbide-silicon composite sintered body or a silicon carbide sintered body.

Examples of the silicon carbide sintered body forming the ceramic bodies 51, 52 include a pressure sintered body and a liquid phase sintered body of an ordinary silicon carbide powder, a reaction sintered body of a raw material powder containing a carbon powder (for example, a mixed powder of a carbon powder and a silicon carbide powder), and the like. The silicon carbide-carbon composite molded body as the ceramic bodies 51, 52 is a green compact of a mixed powder of a silicon carbide powder and a carbon powder, and impregnating this with molten silicon results in the silicon carbide-silicon composite sintered body.

The silicon carbide-carbon composite molded body is produced by, for example, applying pressure formation such as powder pressure molding or pressure casting to a mixed powder of a silicon carbide powder and a carbon powder. For the pressure molding of the mixed powder, metallic mold pressing, rubber pressing, cold isostatic pressing, or the like is applied. When the pressure casting is applied, slurry is prepared by dispersing the mixed powder in water or organic solvent, and pressure casting this slurry under an appropriate pressure. By applying such pressure formation, a molded body having a moderate density (filling state of powder) can be obtained.

As illustrated in FIG. 9A, a viscous material 53 is disposed between the first and second ceramic bodies 51, 52. The viscous material 53 is prepared by mixing a first component formed of a mixture containing a silicon carbide powder, a carbon powder, and a room temperature setting resin, and a second component formed of a curing agent which cures the first component (mixture), and has a silicon carbide powder 54, a carbon powder 55, and a room temperature setting resin composition (mixture of a base resin and a curing agent) 56. The room temperature setting resin in the viscous material 53 is cured under room temperature, and a shaped product 57 having a desired joined member shape is shaped. The viscous material 53 becomes a solidified body adhering to joining faces of the first and second ceramic bodies 51, 52 based on the cured product of the room temperature setting resin cured in the shaping process of the shaped product 57.

Thus, since the viscous material 53 can be solidified under room temperature, it is possible to easily and precisely obtain the shaped product 57 in which the first ceramic body 51 and the second ceramic body 52 are joined via the solidified body of the viscous material 53, without fixing the members to be joined with a jig or the like. Further, it is not necessary to fix the shaped product 57 with a jig or the like in a heat treatment process or an impregnation process of molten silicon thereafter, and thus restrictions on shapes, sizes, and the like of the ceramic bodies 51, 52 and the joined member can be alleviated. That is, it is possible to join the ceramic bodies 51, 52 of various shapes and sizes by the solidified body of the viscous material 53.

Further, since the viscous material 53 can become a solidified body under room temperature, it is possible to precisely control, for example, the distance (joining distance) between the first and second ceramic bodies 51, 52 as well as the thickness of the joining part based on the solidified body of the viscous material 53. The joining distance is based on the thickness of the joining layer (the solidified body layer of the viscous material 53), and further corresponds to the thickness of the joining layer (layer formed of a SiC—Si composite body) after impregnation with molten silicon. The thickness of the joining part (joining layer) affects the strength property and the like of the joined member formed by joining the first ceramic body 51 and the second ceramic body 52. In other words, by precisely controlling the thickness of the joining part, it is possible to increase strength of the joined member and reproducibility thereof.

Figure 9B:
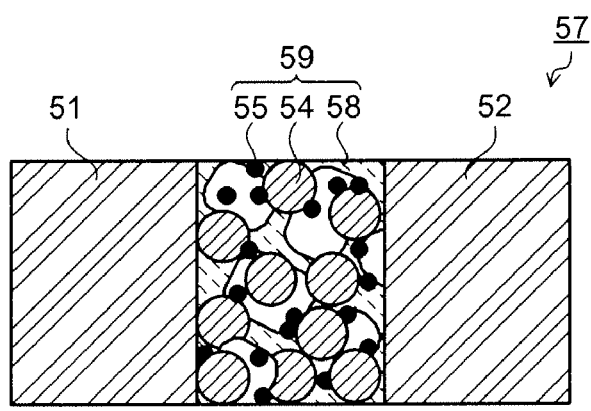
FIG. 9B is a cross-sectional view illustrating a state that the viscous material is made to be a porous body.

Next, as illustrated in FIG. 9B, heat treatment is performed on the shaped product 57 to carbonize the cured product of the room temperature setting resin. The cured product of the room temperature setting resin is disintegrated by the heat treatment and becomes a carbon porous body 58, and this porous body 58 is in a state that the silicon carbide powder 54 and the carbon powder 55 are dispersed inside. Based on such heat treatment (carbonization treatment), the solidified body of the viscous material 53 is turned into a porous body 59. It is preferred that the heat treatment for carbonizing the cured product of the room temperature setting resin be performed at temperatures in the range of 400° C. to 1300° C. When the heat treatment is performed in a reduced pressure atmosphere, it is preferred to be 1 Pa or lower. By performing the heat treatment process under such conditions, formability of the porous body 59 improves.

Figure 9C:
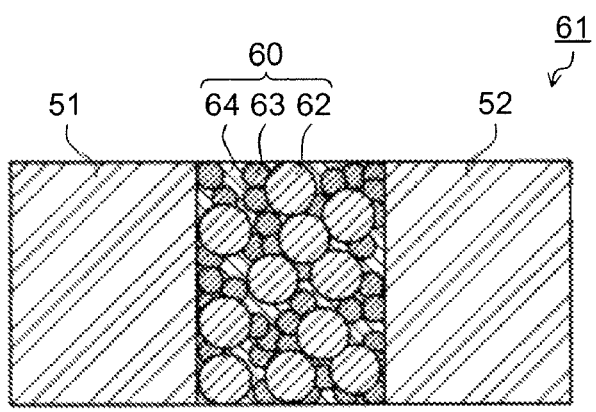
FIG. 9C is a cross-sectional view illustrating a state that the first ceramic body and the second ceramic body are joined by impregnating the porous body with molten silicon.

Thereafter, as illustrated in FIG. 9C, the porous body 59 is impregnated with molten silicon to produce a ceramic joined member 61, in which the first and second ceramic bodies 51, 52 are joined via the joining part formed of a SiC—Si composite body 60. The impregnation process of molten silicon is performed by heating the shaped product 57 having the porous body 59 to temperatures in the range of 1400° C. to 1500° C. in a reduced pressure atmosphere, and impregnating (vacuum impregnating) the porous body 59 in a heated state with molten silicon under the reduced pressure atmosphere. It is preferred that the reduced pressure atmosphere during the vacuum impregnation is at 1 Pa or lower.

When producing the ceramic repaired member, the viscous material (mixture of the first component and the second component) is applied to a repair position, for example a position where a chip or a crack occurred, of a ceramic body formed of a silicon carbide-silicon composite sintered body, a silicon carbide sintered body, or the like, and the material is shaped. When the repair position has a depth, the viscous material is filled in this portion. Thereafter, the ceramic body to which the viscous material is applied is subjected to the above-described heat treatment process (carbonization process) and the impregnation process of molten silicon, to thereby produce the ceramic repaired member having a desired shape.

In the silicon carbide powder 54 existing in the solidified body of the viscous material 53 made to be porous (porous body 59), particles barely grow during the impregnation process of molten silicon and hence become first SiC particles 62 having a particle diameter substantially equal to the mean particle diameter of the silicon carbide powder 54. The carbon component in the porous body 59, that is, carbon 58 originating from the carbon powder 55 and the room temperature setting resin composition 56 contacts and reacts with the molten silicon under high temperatures and generates a silicon carbide (second SiC particles 63). Further, in the porous body 59, the molten silicon remains partially, and this molten silicon exists as a Si phase 64 in interstices among the first and second SiC particles 62, 63.

When the ceramic bodies 51, 52 are silicon carbide-carbon composite molded bodies or the like, the two molded bodies are impregnated with molten silicon at the same time as the porous body 59. In the impregnation process of molten silicon, the two silicon carbide-carbon composite molded bodies react with the molten silicon and become silicon carbide-silicon composite sintered bodies. That is, the ceramic joined member 61 is produced in which the two silicon carbide-silicon composite sintered bodies, which are reaction sintered in the impregnation process of molten silicon, are integrated by the joining part formed of the SiC—Si composite body 60 formed by allowing reaction simultaneously with them. The silicon carbide-silicon composite sintered body has a structure similar to the SiC—Si composite body 60 as the joining part.

The joining part formed of the SiC—Si composite body 60 includes the first and second SiC particles 62, 63 and the Si phase 64 which exists continuously in a network form in interstices among the particles. That is, the joining part has a dense structure in which interstices among the SiC particles 62, 63 are filled with the Si phase 64. When the repair part is formed of the SiC—Si composite body, it has a similar structure. The second SiC particles 63 based on reaction between a carbon component and molten silicon have a mean particle diameter smaller than that of the first SiC particles 62 based on the silicon carbide powder 54 blended in the viscous material 53. Based on the mean particle diameters of the silicon carbide powder 54 and the carbon powder 55 and the mean particle diameters of the first and second SiC particles 62, 63 based thereon, the SiC—Si composite body 60 having a uniform composite structure (in which the Si phase 64 with a uniform size exists continuously in interstices among the SiC particles 62, 63) is obtained.

Further, the SiC—Si composite body 60 has the first SiC particles 62 of appropriate amount based on a blending amount (18 to 60% by volume ratio) with respect to the total powder component of the silicon carbide powder 54 in the viscous material 53, that is, the first SiC particles 62 having a relatively large mean particle diameter. Based on the content of the first SiC particles 62 and the mean particle diameter of the SiC particles 62 or the like based on the mean particle diameter of the silicon carbide powder 54, the distribution states of the second SiC particles 63 in the SiC—Si composite body 60 and the Si phase 64 are uniformed, and moreover, denseness of the SiC—Si composite body 60 also improves. Also from these, it is possible to increase the strength and reproducibility of the SiC—Si composite body 60.

In the SiC—Si composite body 60, it is preferred that the Si phase 64 not only fill the interstices among the SiC particles 62, 63 but exist continuously in a network form in the interstices among the SiC particles 62, 63. When the mesh structure of the Si phase 64 is divided, it leads to occurrence of chalking phenomenon (supply route of molten silicon is interrupted and reaction of carbon stops), and the residual carbon amount increases, where there is a concern that the strength of the joining part formed of the SiC—Si composite body 60 decreases. In other words, it is possible to obtain a dense and strong joining part by allowing the Si phase 64 to exist continuously in interstices among the SiC particles 62, 63.

In the above-described manufacturing process of the ceramic joined member (composite member), it is preferred that the porous body 59 have a mean pore diameter in the range of 0.5 μm to 5 μm. The mean pore diameter of the porous body 59 indicates a mean value of diameters obtained using a mercury intrusion method by assuming that they are columns. By impregnating the porous body 59 having such a mean pore diameter with molten silicon, it is possible to improve strength properties (joining strength of the SiC—Si composite body 60, strength of the SiC—Si composite body 60 itself, strength of the joined member 61 including the SiC—Si composite body 60, and so on) based on the distribution state, the mean diameter, and the like of the Si phase (free Si phase) 64 in the SiC—Si composite body 60.

When the mean pore diameter of the porous body 59 is smaller than 0.5 μm, the supply route of the molten silicon is interrupted which can lead to increase in residual carbon amount, and a crack can easily occur due to volume expansion when a silicon carbide is generated from carbon. When the mean pore diameter of the porous body 59 is larger than 5 μm, the amount of the Si phase 64 increases. Any of these decreases the strength of the SiC—Si composite body 60. Further, when the mean pore diameter of the porous body 59 is too large, a crack or the like can easily occur before impregnation with molten silicon, and manufacturing yields and strength of the ceramic joined member 61 decrease.

Further, it is preferred that the Si phase 54 has a mean diameter in the range of 0.2 μm to 2 μm. The mean diameter of the Si phase 64 corresponds to the mean distance among the SiC particles 62, 63. The mean diameter of the SiC phase 64 indicates a value obtained as follows. First, the ceramic joined member 61 having the SiC—Si composite body 60 is heated to 1600° C. under a reduced pressure to remove free Si in the SiC—Si composite body 60. The mean diameter of the Si phase 64 indicates a mean value of diameters obtained by assuming the diameters of small holes formed by removing free Si as columns using a mercury intrusion method. This value matches results of cross-section observation of the minute structure of SiC—Si composite body 60 with a metallurgical microscope or SEM.

When the mean diameter of the Si phase 64 is small, this means that the Si phase 64 with low strength is miniaturized. Further, this also means that the Si phase 64 is distributed homogeneously in interstices among the SiC particles 62, 63. The interstices among the SiC particles 62, 63 are filled evenly with the Si phase 64. By thus controlling the mean diameter of the Si phase 64 to be in the range of 0.2 μm to 2 μm, strength of the joining part formed of the SiC—Si composite body 60 and further strength as the ceramic joined member 61 including the joining part can be increased with good reproducibility.

When the mean diameter of the Si phase 64 is larger than it becomes close to a state that the Si phase 64 with low strength is segregated, and the influence of the Si phase 64 on strength of the SiC—Si composite body 60 becomes large. Therefore, strength of the SiC—Si composite body 60 and strength of the ceramic joined member 61 decrease easily. When the mean diameter of the Si phase 64 is smaller than 0.2 μm, it is difficult to maintain the continuous structure in a network form. Accordingly, pores or free carbon can occur easily in the SiC—Si composite body 60, and dispersion in strength of the joining part can easily occur. This is similar when a repair part is formed of a SiC—Si composite body.

The mean diameter of the Si phase 64 can be controlled based on the mean pore diameter of the porous body 59 before impregnation with molten silicon and the mean particle diameters of the silicon carbide powder 54 and the carbon powder 55 blended in the viscous material 53. That is, by using the silicon carbide powder 54 having a mean particle diameter in the range of 0.5 μm to 5 μm and the carbon powder 55 having a mean particle diameter in the range of 0.3 μm to 3 μm, and controlling the mean pore diameter of the porous body 59 to be in the range of 0.5 μm to 5 μm, the Si phase 64 which is minute and homogeneous (for example, the Si phase 64 with a mean diameter in the range of 0.2 μM to 2 μm) can be obtained.

In the manufacturing process of the ceramic composite member, it is preferred that the impregnation process of molten silicon be performed at temperatures in the range of 1400° C. to 1500° C. It is preferred that the reduced pressure atmosphere for impregnating molten silicon is at 1 Pa or lower. By performing the impregnation process of molten silicon under such conditions, an impregnation characteristic of molten silicon and formability of the SiC particles 63 improve, and minute pores (micro-pores or nano-pores) in the Si phase 64 can be decreased significantly. Therefore, strength of the SiC—Si composite body 60 and reproducibility thereof can be increased.

In the manufacturing process of the ceramic joined member 61 in this embodiment, when two ceramic bodies 51, 52 are joined with the viscous material 53, they can be cured in a state that the joining part is shaped in a predetermined form. Thus, it is applicable to a large structural member, a complicated shape part, and the like and the precision of shape of the joining part can be increased. Therefore, it is possible to obtain a joining part in which dispersion in strength and material properties such as thermal properties are suppressed.

With the above-described joining part, in addition to improvement in its material properties, it is possible to improve material properties of the ceramic joined member 61 having the joining part and reproducibility thereof. Since it is unnecessary to fix members to be joined with a jig or the like, manufacturing costs and the number of manufacturing steps of the ceramic joined member 61 can be reduced. Note that it is not intended to prohibit use of a jig or the like when the shapes of joined members are complicated or when there are many joining positions.

Further, in the manufacturing process of the ceramic joined member 61, the joining part formed of the SiC—Si composite body 60 excels not only in joining strength with respect to the ceramic bodies 51, 52 but in its strength and reproducibility thereof. Therefore, a plurality of ceramic bodies 51, 52 can be joined with high strength, and strength of the ceramic joined member 61 can be increased with good reproducibility. These make it possible to provide the ceramic joined member 61 with high strength at low cost, which is preferable for complicated shapes and large structural members and parts. Further, this is also the same when the manufacturing process of this embodiment is applied to production of a ceramic repaired member, and increase in strength of ceramic repaired members, improvement in precision of shape, cost reduction, and so on can be achieved.

In the above-described composite members such as the ceramic joined member 61 and the ceramic repaired members, mechanical properties such as strength can be increased with good reproducibility, and thus they are applicable to various members and parts which are required to have high strength. They contribute largely to increase in strength in particular of large structural objects, complicated shape parts, and the like. The ceramic composite member can be applied to various apparatus parts and apparatus members such as semiconductor manufacturing apparatus jigs, semiconductor related parts (heat sinks, dummy wafers, and the like), high-temperature structural members for gas turbine, high-temperature members for heat accumulator, structural members for space and aerial use, mechanical sealing members, brake members, sliding parts, mirror parts, pump parts, heat exchanger parts, chemical plant components, and the like. In particular, the ceramic composite member is used preferably for apparatus parts and members which are required to have high strength.

Next, specific examples and evaluation results thereof will be described.

(Viscous Materials 1 to 6)

Viscous materials 1 to 6 were produced as follows. First, as the room temperature setting resin composition, an epoxy-based resin composition and a phenol-based resin composition which have a room temperature setting property were prepared. To the base resin of each room temperature setting resin composition illustrated in Table 1, a silicon carbide powder having a mean particle diameter in the range of 0.5 μm to 5 μm and a carbon powder having a mean particle diameter in the range of 0.3 μm to 3 μm were added and mixed. The mean particle diameters of the silicon carbide powder and the carbon powder, the volume ratio of the silicon carbide powder in the viscous material, and the total mass ratio of the silicon carbide powder and the carbon powder are as illustrated in Table 1.

To each mixture of the above-described base resin of the room temperature setting resin composition, the silicon carbide powder, and the carbon powder, the curing agent of the room temperature setting resin composition was added and mixed sufficiently, thereby preparing viscous materials 1 to 6. Note that the curing agent of the room temperature setting resin composition was mixed just before the viscous material is applied in the manufacturing process of the ceramic composite member (for joined members, just before disposing between joining faces of the ceramic bodies, and for repaired members, just before disposing on a part of a ceramic body) of examples 1 to 15, which will be described later. Specific structures of the viscous materials 1 to 6 are as illustrated in Table 1.

TABLE 1

| | | Powder component | | | |
| | | Silicon carbide powder | | Carbon powder | |
| | Resin component (room temperature setting resin) | Mean particle diameter (μm) | Volume ratio (%) | Mean particle diameter (μm) | Total mass ratio (%) |
| --- | --- | --- | --- | --- | --- |
| Viscous material 1 | Epoxy resin | 0.5 | 18 | 0.3 | 29 |
| Viscous material 2 | Epoxy resin | 1 | 22 | 1 | 44 |

TABLE 1-continued

| | | Powder component | | | |
| | | Silicon carbide powder | | Carbon powder | |
| | Resin component (room temperature setting resin) | Mean particle diameter (μm) | Volume ratio (%) | Mean particle diameter (μm) | Total mass ratio (%) |
|---|---|---|---|---|---|
| Viscous material 3 | Epoxy resin | 2 | 40 | 1 | 47 |
| Viscous material 4 | Phenol resin | 1 | 27 | 0.8 | 33 |
| Viscous material 5 | Phenol resin | 2 | 45 | 1.5 | 47 |
| Viscous material 6 | Phenol resin | 5 | 60 | 3 | 55 |

EXAMPLE 1

The silicon carbide powder having a mean particle diameter of 0.8 μm and the carbon powder (carbon black) having a mean particle diameter of 0.4 μm were mixed with a mass ratio of 10:3 (=SiC:C). After this mixed powder was mixed with an appropriate amount of organic binder and thereafter it was dispersed in a solvent, thereby preparing slurry. This slurry was filled into a forming die using a pressure casting device while applying a pressure. In this manner, two SiC-C composite molded bodies (green compacts) were produced.

Next, after the viscous material 1 in Table 1 was disposed between joining faces of the two SiC—C composite molded bodies, the room temperature setting resin composition was cured to make a shaped product having a desired joined member shape. This shaped product was heated to a temperature of 1000° C. in a nitrogen or argon atmosphere, so as to carbonize the cured product of the room temperature setting resin composition. In this carbonization treatment, the solidified body of the viscous material becomes a porous body. The mean pore diameter of the porous body was 1.0 μm. Thereafter, the shaped product in which the two molded bodies are connected by the porous body was heated to a temperature of 1450° C. in a reduced pressure atmosphere at 1 Pa or lower, and meanwhile the two molded bodies and the porous body forming the joining part were impregnated with molten silicon.

Next, in the impregnation process of molten silicon, the two molded bodies were made to react with molten silicon, so as to make SiC—Si composite sintered bodies, and they were joined with the SiC—Si composite body which is a product of reaction of the porous body and the molten silicon. Regarding the ceramic joined member obtained in this manner, after the surface of the joining part formed of the SiC—Si composite body was polished, the minute structure was observed with an electron microscope. As a result, it was recognized that the joining part has a structure in which the Si phase exists continuously in a network form in interstices among the SiC particles. The mean diameter of the Si phase was 0.7 μm. Such a ceramic composite member was subjected to property evaluation, which will be described later.

EXAMPLE 2

Two SiC-C composite molded bodies produced similarly to example 1 were heated to a temperature of 600° C. and held in an inert gas atmosphere, so as to remove the organic binder. The molded body after being degreased was heated to a temperature of 1450° C. in a reduced pressure atmosphere at $1 \times 10^{-1}$ Pa, and the molded body keeping this heated state was impregnated with molten silicon. By causing reaction sintering of the molded body in the impregnation process of molten silicon (generation of SiC and densification by the Si phase), two SiC—Si composite sintered bodies were produced.

Next, after the viscous material 2 in Table 1 was disposed between joining faces of the two SiC—Si composite sintered bodies, the room temperature setting resin composition was cured to make a shaped product having a desired joined member shape. This shaped product was heated to a temperature of 800° C. in an inert atmosphere, so as to carbonize the cured product of the room temperature setting resin composition. In this carbonization treatment, the solidified body of the viscous material becomes a porous body. The mean pore diameter of the porous body was 0.8 μm. Thereafter, the shaped product in which the two sintered bodies are connected by the porous body was heated to temperatures of 1400° C. to 1500° C. in a reduced pressure atmosphere at 1 Pa or lower, and meanwhile the porous body forming the joining part were impregnated with molten silicon.

Next, in the impregnation process of molten silicon, the two SiC—Si composite sintered bodies were joined with the SiC—Si composite body which is a product of reaction of the porous body and the molten silicon. Regarding the ceramic joined member obtained in this manner, after the surface of the joining part formed of the SiC—Si composite body was polished, the minute structure was observed with an electron microscope. As a result, it was recognized that the joining part has a structure in which the Si phase exists continuously in a network form in interstices among the SiC particles. The mean diameter of the Si phase was 0.5 μm. Such a ceramic composite member was subjected to property evaluation, which will be described later.

EXAMPLES 3 TO 10

As members to be joined, there were prepared SiC-C composite molded bodies, SiC—Si composite sintered bodies, SiC sintered bodies by powder sintering method, and $Si_3N_4$ sintered bodies. They were joined based on combinations illustrated in Table 2 to produce ceramic joined members. The joining process was performed similarly to examples 1, 2. Viscous materials used for joining are as illustrated in Table 2. Table 3 illustrates structures of joining parts. All the joining parts of the respective ceramic joined members had a structure in which a Si phase exists continuously in a network form in interstices among SiC particles. Each of the ceramic joined members was subjected to property evaluation, which will be described later.

COMPARATIVE EXAMPLE 1

A silicon foil was sandwiched between two SiC—Si composite sintered bodies produced similarly to example 2, and they were fixed by a jig. Thereafter, they were heated to temperatures at which the silicon foil melts, so as to join them. A ceramic joined member obtained in this manner was subjected to property evaluation, which will be described later.

COMPARATIVE EXAMPLE 2

On joining faces of two SiC—Si composite molded bodies produced similarly to example 1, slurry prepared by dispersing a silicon carbide powder, a carbon powder, and the like in a solvent was applied to join them, and they were fixed with a jig. Thereafter, they were impregnated with molten silicon similarly to example 1. A ceramic joined member obtained in this manner was subjected to property evaluation, which will be described later.

TABLE 2

|  | Ceramic body 1 | Ceramic body 2 | Joining material |
|---|---|---|---|
| Example 1 | SiC—C composite molded body | SiC—C composite molded body | Viscous material 1 |
| Example 2 | SiC—Si composite sintered body | SiC—Si composite sintered body | Viscous material 2 |
| Example 3 | SiC—C composite molded body | SiC—C composite molded body | Viscous material 3 |
| Example 4 | SiC—C composite molded body | SiC—C composite molded body | Viscous material 4 |
| Example 5 | SiC sintered body | SiC sintered body | Viscous material 5 |
| Example 6 | SiC sintered body | SiC sintered body | Viscous material 6 |
| Example 7 | SiC—Si composite sintered body | SiC sintered body | Viscous material 2 |
| Example 8 | SiC—C composite molded body | SiC—Si composite sintered body | Viscous material 3 |
| Example 9 | $Si_3N_4$ sintered body | $Si_3N_4$ sintered body | Viscous material 4 |
| Example 10 | $Si_3N_4$ sintered body | $Si_3N_4$ sintered body | Viscous material 5 |
| Comparative Example 1 | SiC—Si composite sintered body | SiC—Si composite sintered body | Silicon foil |
| Comparative Example 2 | SiC—C composite molded body | SiC—C composite molded body | Slurry |

Measurement of joining strength (4-point bending measurement) of the respective ceramic joined members according to examples 1 to 10 and Comparative Examples 1 and 2 was conducted in accordance with JIS R 1624. Results are illustrated in Table 3. Table 3 illustrates mean pore diameters of porous bodies formed in the course of manufacturing the ceramic joined members, as well as mean diameters of Si phases in the final ceramic joined members. Further, applicable ranges of manufacturing processes of the examples are studied. One applicable to a large structural member, a complicated shape part, or the like is marked "Yes", and one which is practically difficult to apply is marked "No".

TABLE 3

|  | Joining part | | | |
|---|---|---|---|---|
|  | Mean pore diameter (μm) of porous layer | Mean diameter of Si phase (μm) | Bending strength (MPa) | Applicable range |
| Example 1 | 1.0 | 0.7 | 600-650 | Yes |
| Example 2 | 0.8 | 0.5 | 700-750 | Yes |
| Example 3 | 0.5 | 0.2 | 850-900 | Yes |
| Example 4 | 1.5 | 0.9 | 550-600 | Yes |
| Example 5 | 2.5 | 1.5 | 400-450 | Yes |
| Example 6 | 4.0 | 2.5 | 350-400 | Yes |
| Example 7 | 2.0 | 1.2 | 600-700 | Yes |
| Example 8 | 0.7 | 0.4 | 750-800 | Yes |
| Example 9 | 3.0 | 1.8 | 400-450 | Yes |
| Example 10 | 0.9 | 0.6 | 650-700 | Yes |
| Comparative Example 1 | — | — | 80 | No |
| Comparative Example 2 | — | 10 | 100 | No |

As is clear from Table 3, it can be seen that the ceramic joined members of examples 1 to 10 all excel in mechanical properties such as joining strength, as compared to Comparative Examples 1 and 2. It was recognized that the joining part has properties equivalent to those of the SiC—Si composite sintered body or the like of the base member. Further, it was recognized that the joining parts according to examples 1 to 10 also excel in thermal properties such as heat conductivity. Note that the heat conductivity was measured in accordance with JIS R 1611. Further, examples 1 to 10 can be applied to members and parts of various shapes and sizes. Regarding the sizes, it was recognized that they are applicable to large structural members of meter-class size.

In Comparative Example 1, the members must be fixed with a jig or the like so as to keep the joined shape and prevent the sandwiched silicon foil from falling off while being heated. Further, heating must be performed in a state that melted silicon would not drip off. Accordingly, application to parts of various shapes and sizes, particularly to large structural members and complicated shape parts is difficult. In a state of being joined with the slurry of Comparative Example 2 and dried, members have almost no strength, and thus application of the manufacturing process of Comparative Example 2 to parts of various shapes and sizes, particularly to large structural members and complicated shape parts is difficult.

EXAMPLE 11

A SiC—Si composite sintered body was produced similarly to example 2, and a cutout was formed thereon for forming a repair part. The size of the cutout was 20 mm. In the cutout of this SiC—Si composite sintered body, the viscous material 2 of Table 1 was applied and filled, and thereafter the room temperature setting resin composition was cured. This SiC—Si complex sintered body was heated to a temperature of 1000° C. in an inert atmosphere to carbonize the cured product of the room temperature setting resin composition. The solidified body of the viscous material becomes a porous body through this carbonization treatment. The mean pore diameter of the porous body was 0.5 μm to 2.0 μm. Thereafter, the SiC—Si composite sintered body was heated to a temperature of 1450° C. in a reduced pressure atmosphere at 1 Pa or lower, and meanwhile the porous body forming the repair part was impregnated with molten silicon.

In the impregnation process of molten silicon, the cutout of the SiC—Si composite sintered body was repaired with the SiC—Si composite body which is the product of reaction between the porous body and the molten silicon. Regarding the ceramic repaired member obtained in this manner, after the surface of the repair part formed of the SiC—Si composite body was polished, the minute structure was observed with an electron microscope. As a result, it was recognized that the repair part has a structure in which the Si phase exists continuously in a network form in interstices among the SiC particles. The mean diameter of the Si phase was 0.2 μm to 1.2 μm. Strength of this ceramic repaired member was measured, and it was recognized that it has strength equivalent to that of a SiC—Si composite sintered body which does not have a repair part.

EXAMPLES 12 TO 15

As members to be repaired, there were prepared a SiC—Si composite sintered body, a SiC—Si composite molded body, and SiC sintered bodies by powder sintering method. They were repaired based on combinations illustrated in Table 4 to produce ceramic repaired members. The repairing process was performed similarly to example 11. Viscous materials used for repair are as illustrated in Table 4. Results of measuring strength of each ceramic repaired member are illustrated in Table 5. Table 5 also illustrates structures of the repair parts.

TABLE 4

|  | Ceramic body | Repair material |
| --- | --- | --- |
| Example 11 | SiC—Si composite sintered body | Viscous material 2 |
| Example 12 | SiC sintered body | Viscous material 2 |
| Example 13 | SiC—C composite molded body | Viscous material 2 |
| Example 14 | SiC—Si composite sintered body | Viscous material 5 |
| Example 15 | SiC sintered body | Viscous material 5 |

TABLE 5

| | Repair part | | |
| --- | --- | --- | --- |
| | Mean pore diameter (μm) of porous layer | Mean diameter of Si phase (μm) | Bending strength (MPa) |
| Example 11 | 0.5-2.0 | 0.2-1.2 | 600-900 |
| Example 12 | 1.0-4.0 | 0.6-2.5 | 350-600 |
| Example 13 | 0.5-2.0 | 0.2-1.2 | 600-900 |
| Example 14 | 0.8-1.5 | 0.5-0.9 | 550-750 |
| Example 15 | 2.0-5.0 | 1.2-2.0 | 350-600 |

As is clear from Table 5, all the ceramic repaired members in which repair parts are formed with a SiC—Si composite body have strength equivalent to that of a sintered body having no repair part, and effectiveness of the repair parts formed of a SiC—Si composite body was recognized. Further, the viscous materials used as a repairing material can be solidified during molding, and thus it is possible to increase the shape precision of a repair part. Therefore, reliability and repair yields of repaired ceramic members improve.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrical power storage system using hydrogen, comprising:
   a power generation unit generating power using hydrogen and oxidant gas;
   an electrolysis unit electrolyzing steam to generate hydrogen;
   a hydrogen storage unit storing hydrogen generated by the electrolysis and supplying the hydrogen to the power generation unit during power generation;
   a high-temperature heat storage unit storing first heat generated accompanying the power generation and supplying the first heat to the electrolysis unit during the electrolysis; and
   a low-temperature heat storage unit storing second heat, which is exchanged in the high-temperature heat storage unit and is lower than the temperature of the first heat stored in the high-temperature heat storage unit, and generating with the second heat the steam supplied to the electrolysis unit,
   wherein at least one of the high-temperature heat storage unit and the low-temperature heat storage unit comprises a plurality of capsules, a heat storage material encapsulated in the plurality of capsules and having a melting point configured to melt when storing heat and to solidify when releasing heat, and a heat storage container accommodating the plurality of capsules and forming flow paths of a heat medium fluid flowing around the plurality of capsules, and
   wherein each of the capsules has a first ceramic member and a second ceramic member, at least one of which has a container shape, the first ceramic member and the second ceramic member are joined via a joining layer in a state that the heat storage material is inserted therebetween, and the joining layer is provided with a ceramic layer formed by firing a ceramic precursor, a carbon layer formed by firing a carbon adhesive, or a silicon layer formed by firing a silicon brazing material.

2. The electrical power storage system according to claim 1, wherein the power generation unit and the electrolysis unit are composed of a solid electrolyte fuel cell comprising a solid-oxide electrolyte and combining a fuel cell and a steam electrolysis cell, and are structured to be operable by switching between respective operating modes of the power generation unit and the electrolysis unit over time.

3. The electrical power storage system according to claim 1, wherein the power generation unit is composed of a solid electrolyte fuel cell comprising a solid-oxide electrolyte, and the electrolysis unit is composed of a steam electrolysis cell comprising a solid-oxide electrolyte and being separate from the solid electrolyte fuel cell.

4. The electrical power storage system according to claim 1, wherein the plurality of capsules are formed of at least one selected from a silicon carbide sintered body, a silicon carbide-silicon composite sintered body, a silicon carbide-based long fiber composite material, a boron carbide sintered body, a silicon nitride sintered body, a boron nitride sintered body, and graphite.

5. The electrical power storage system according to claim 1, wherein the high-temperature heat storage unit comprises a heat storage material formed of at least one selected from sodium chloride, potassium chloride, magnesium chloride, calcium chloride, lithium fluoride, sodium fluoride, lithium carbonate, sodium carbonate, potassium carbonate, and lithium hydroxide.

6. The electrical power storage system according to claim 1, wherein the low-temperature heat storage unit comprises a heat storage material formed of at least one selected from xylitol, erythritol, mannitol, sorbitol, alditol, and urea.

7. The electrical power storage system according to claim 1, wherein the low-temperature heat storage unit comprises a heat storage material formed of at least one selected from aluminum chloride, iron chloride, lithium hydroxide, sodium hydroxide, potassium hydroxide, sodium nitrite, lithium nitrate, sodium nitrate, and potassium nitrate.

8. An electrical power storage system using hydrogen, comprising:
   a power generation unit generating power using hydrogen and oxidant gas;
   an electrolysis unit electrolyzing steam to generate hydrogen;

a hydrogen storage unit storing hydrogen generated by the electrolysis and supplying the hydrogen to the power generation unit during power generation;

a high-temperature heat storage unit storing first heat generated accompanying the power generation and supplying the first heat to the electrolysis unit during the electrolysis; and a low-temperature heat storage unit storing second heat, which is exchanged in the high-temperature heat storage unit and has a temperature lower than a temperature of the first heat stored in the high-temperature heat storage unit, and generating with the second heat the steam supplied to the electrolysis unit, wherein at least one of the high-temperature heat storage unit and the low-temperature heat storage unit comprises a plurality of capsules, a heat storage material encapsulated in the plurality of capsules and having a melting point configured to melt when storing heat and to solidify when releasing heat, and a heat storage container accommodating the plurality of capsules and forming flow paths of a heat medium fluid flowing around the plurality of capsules, and wherein each of the capsules has a first ceramic member and a second ceramic member, at least one of which has a container shape, the first ceramic member and the second ceramic member are joined via a joining layer formed of a silicon carbide-silicon composite body in a state that the heat storage material is inserted therebetween, and the silicon carbide-silicon composite body includes silicon carbide particles and a silicon phase which exists continuously in interstices among the silicon carbide particles.

9. The electrical power storage system according to claim 8, wherein the power generation unit and the electrolysis unit are composed of a solid electrolyte fuel cell comprising a solid-oxide electrolyte and combining a fuel cell and a steam electrolysis cell, and are structured to be operable by switching between respective operating modes of the power generation unit and the electrolysis unit over time.

10. The electrical power storage system according to claim 8, wherein the power generation unit is composed of a solid electrolyte fuel cell comprising a solid-oxide electrolyte, and the electrolysis unit is composed of a steam electrolysis cell comprising a solid-oxide electrolyte and being separate from the solid electrolyte fuel cell.

11. The electrical power storage system according to claim 8, wherein the plurality of capsules are formed of at least one selected from a silicon carbide sintered body, a silicon carbide-silicon composite sintered body, a silicon carbide-based long fiber composite material, a boron carbide sintered body, a silicon nitride sintered body, a boron nitride sintered body, and graphite.

12. The electrical power storage system according to claim 8, wherein the silicon carbide-silicon composite body forming the joining layer is formed by impregnating a porous body having first silicon carbide particles and carbon with molten silicon, causing the carbon to react with the molten silicon to generate second silicon carbide particles, and leaving part of the molten silicon as the silicon phase.

13. The electrical power storage system according to claim 12, wherein the porous body is formed by disposing a viscous material, containing a silicon carbide powder having a mean particle diameter in the range of 0.5 μm to 5 μm, a carbon powder having a mean particle diameter in the range of 0.3 μm to 3 μm, and a room temperature setting resin and a curing agent thereof, between the first ceramic member and the second ceramic member, curing the room temperature setting resin under room temperature to make a solidified body, and heat treating the solidified body to carbonize a cured product of the room temperature setting resin.

14. The electrical power storage system according to claim 13, wherein a volume ratio of the silicon carbide powder to all powder components in the viscous material is in a range of 18% to 60%, and a total mass ratio of the silicon carbide powder and the carbon powder is in a range of 29% to 55% of the entire viscous material.

15. The electrical power storage system according to claim 8, wherein the high-temperature heat storage unit comprises a heat storage material formed of at least one selected from sodium chloride, potassium chloride, magnesium chloride, calcium chloride, lithium fluoride, sodium fluoride, lithium carbonate, sodium carbonate, potassium carbonate, and lithium hydroxide.

16. The electrical power storage system according to claim 8, wherein the low-temperature heat storage unit comprises a heat storage material formed of at least one selected from xylitol, erythritol, mannitol, sorbitol, alditol, and urea.

17. The electrical power storage system according to claim 8, wherein the low-temperature heat storage unit comprises a heat storage material formed of at least one selected from aluminum chloride, iron chloride, lithium hydroxide, sodium hydroxide, potassium hydroxide, sodium nitrite, lithium nitrate, sodium nitrate, and potassium nitrate.

* * * * *